(12) United States Patent
Chou et al.

(10) Patent No.: US 8,498,970 B2
(45) Date of Patent: Jul. 30, 2013

(54) FILE PROCESSING DEVICE AND METHOD

(75) Inventors: Cheng-Hao Chou, Guangdong (CN);
Bo-Ching Lin, Guangdong (CN);
Zai-An Pan, Guangdong (CN); Li Wang, Guangdong (CN)

(73) Assignees: Hong Fu Jin Precision Industry (Shen Zhen) Co., Ltd., Longhus Town, Bao'an District, Shenzhen, Guangdong Province (CN); Hon Hai Precision Industry Co., Ltd., Tucheng Dist., New Taipei (TW)

( * ) Notice: Subject to any disclaimer, the term of this patent is extended or adjusted under 35 U.S.C. 154(b) by 902 days.

(21) Appl. No.: 12/134,218

(22) Filed: Jun. 6, 2008

(65) Prior Publication Data
US 2008/0306901 A1 Dec. 11, 2008

(30) Foreign Application Priority Data

Jun. 8, 2007 (CN) .......................... 2007 1 0074772

(51) Int. Cl.
*G06F 7/00* (2006.01)
(52) U.S. Cl.
USPC ........................................................ 707/694

(58) Field of Classification Search
USPC .......... 707/694, 695, 609, 640, 661; 711/164; 709/203, 219, 224
See application file for complete search history.

(56) References Cited

U.S. PATENT DOCUMENTS

| 4,355,361 | A | * | 10/1982 | Riggs et al. .................... 713/600 |
| 5,592,662 | A | * | 1/1997 | Sawada et al. ........................ 1/1 |
| 6,240,451 | B1 | * | 5/2001 | Campbell et al. ............. 709/224 |
| 6,324,544 | B1 | * | 11/2001 | Alam et al. ........................... 1/1 |
| 7,249,119 | B2 | * | 7/2007 | Shitomi et al. ......................... 1/1 |
| 8,190,576 | B2 | * | 5/2012 | Yamaguchi et al. .......... 707/653 |
| 2002/0078142 | A1 | * | 6/2002 | Moore et al. ................... 709/203 |
| 2005/0182827 | A1 | * | 8/2005 | Kikinis ......................... 709/219 |
| 2007/0198795 | A1 | * | 8/2007 | Harada ........................ 711/164 |

FOREIGN PATENT DOCUMENTS

| TW | 200530938 | 9/2005 |
| TW | 200725449 | 7/2007 |

* cited by examiner

*Primary Examiner* — Hung T Vy
(74) *Attorney, Agent, or Firm* — Winston Hsu; Scott Margo (57) ABSTRACT

A file processing device and a method are provided. The method includes: providing a storage unit for storing a connection date when an exterior storage device is connected to a file processing device; retrieving a last connection date of the exterior storage device; selecting the exterior storage device for files or file folders whose date information is later than the last connection date; and copying and saving the selected files or file folder to the file processing device.

2 Claims, 6 Drawing Sheets

FIG. 1

| ID | Last Connection Date |
|---|---|
| XXX | 070118 |
| XXX | 070228 |
| XXX | 070315 |

FILE PROCESSING DEVICE AND METHOD

BACKGROUND

1. Technical Field

The present invention relates to a file processing device and method.

2. General Background

Digital photos are ubiquitous and digital cameras are becoming more widespread. Digital photos may be viewed on the display screen of a digital camera or they can be printed or uploaded to a computer and displayed on the computer screen.

Printed digital photos require digital photographic printers, photographic papers, and color ink for color photos. The cost of photographic papers and color ink are related to the numbers of prints. Printed photos are sometimes framed and can be hung on walls or placed on top of desks or tables. Because photographic frames typically hold a single photo, not many photos will actually be framed and displayed. Storing digital photos on computer hard drives and displaying them on computer screens is cheaper than framing them. However it is not convenient to show photos on computer screens because computers are bulky devices and it may not be convenient for viewers to carry a computer with them everywhere they go. To overcome the problem of carrying computers to display photographs, digital photo frames are now being used.

A digital photo frame looks like a traditional photo frame. Typically digital photo frames include built-in memory storage and provisions for accepting external memory cards. Thus, one digital photo frame is capable of displaying more than one digital photo, which is stored in the internal memory or on memory cards attached to the digital photo frame.

When copying digital photos from external storage devices, the digital photo frame generally copies all files (e.g., digital photos) without taking into account whether there are redundant files in the internal memory. As a result, some redundant files may be copied to the internal memory, thereby resulting in a waste of effort and storage space.

What is needed, therefore, is an improved file processing device and method that can effectively copies files from an external storage device.

SUMMARY

A file processing device is provided. The device includes a storage unit, an interface unit, a connection managing module, a date information obtaining module, a comparing module, and a storage control module. The interface unit is configured for connecting to an exterior storage device. The connection managing module is configured for obtaining an identifier (ID) of the exterior storage device connected to the file processing and recording a relationship between the obtained ID and a current connection date in the storage unit. The date information obtaining module is configured for obtaining date information of a file and/or a file folder stored in the exterior storage device, and for obtaining a last connection date of the exterior storage device according to the ID and the connection data recorded in the storage unit. The comparing module is configured for generating a matching signal when the date information is later than the last connection date, wherein the matching signal indicates a file or a file folder whose date information is later than the last connection date, together with its file structure. The storage control module is configured for copying the file and/or file folder from the exterior storage device according to the matching signal, and storing them in the storage unit.

A file processing method is also provided. The method includes: (a) providing a storage unit for storing a connection date when an exterior storage device is connected to a file processing device; (b) obtaining a last connection date of an exterior storage device when the exterior storage device is connected to the file processing device; (c) searching the exterior storage device for a file and/or a file folder whose date information is later than the last connection date; and (d) copying the file and/or file folder to the file processing device.

Other advantages and novel features will be drawn from the following detailed description with reference to the attached drawing.

BRIEF DESCRIPTION OF THE DRAWINGS

The components of the drawings are not necessarily drawn to scale, the emphasis instead being placed upon clearly illustrating the principles of the file processing device and method. Moreover, in the drawings, like reference numerals designate corresponding parts throughout the several views.

DETAILED DESCRIPTION OF THE EMBODIMENTS

Figure 1:
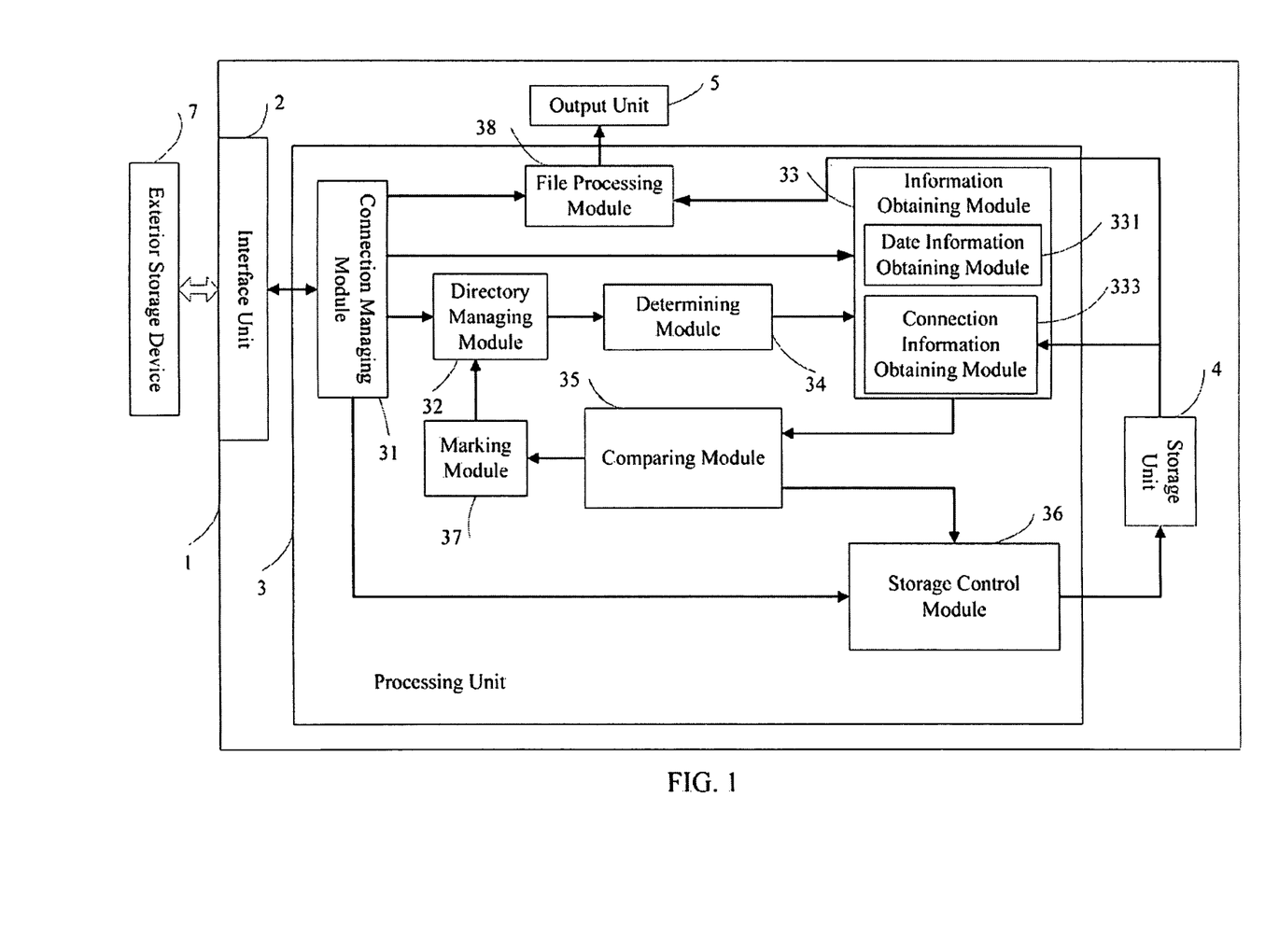
FIG. 1 is a schematic diagram of a hardware infrastructure of a file processing device according to an exemplary embodiment of the present invention.
Figure 2:
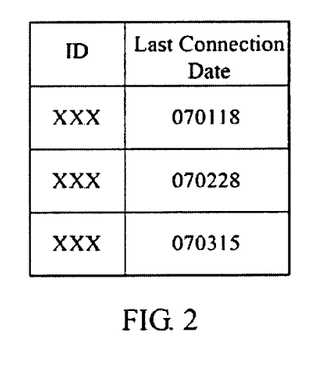
FIG. 2 is a schematic diagram illustrating connection records between the file processing device and an exterior storage device of FIG. 1.

FIG. 1 is a schematic diagram of a hardware infrastructure of a file processing device according to an exemplary embodiment of the present invention. The file processing device 1 includes an interface unit 2, a processing unit 3, a storage unit 4, and an output unit 5. The interface unit 2 is configured for connecting to an exterior storage device 7. The exterior storage device 7 can be any suitable portable device for storing data, such as secure digital card (SD), multimedia card (MMC), magnetic disk, compact disk read-only memory (CD-ROM) storage, flash memory etc. Furthermore, the exterior storage device 7 has an identification number (ID). The storage unit 40 is configured for storing files and a connection record table (see FIG. 2). The connection record table is configured for recording a relationship between the ID of the exterior storage device 7 and the connection date when the exterior storage device 7 is connected to the file processing device 1.

The processing unit 3 includes a connection managing module 31, a directory managing module 32, an information obtaining module 33, a determining module 34, a comparing module 35, a storage control module 36, a marking module 37, and a file processing module 38. The information obtaining module 33 includes a date information obtaining module 331 and a connection information obtaining module 333.

The file processing module 38 is configured for obtaining files from the storage unit 4 or the exterior storage device 7 connected to the interface unit 2, processing the obtained files under a predefined process, and outputting the processed files through the output unit 5. For example, in an exemplary embodiment, when the file processing device 1 is a digital photo frame, the file processing module 38 is typically an image processing module for processing image files under the predefined processes, such as, zooming in, zooming out, rotation, etc., and the output unit 5 is typically a display for displaying the processed images thereon.

When the exterior storage device 7 is, for the first time, connected to the file processing device 1, the file processing device 1 finds no record of connection data for the storage device 7, and copies the files and/or file folders from the exterior storage device 7 to the storage unit 4. When the exterior storage device 7 is, not for the first time, connected to the file processing device 1, the file processing device 1 retrieves the connection data based on the exterior storage device's ID and performs an analysis on the files and/or file folders in the exterior storage device 7 to determine whether the files or file folders need to be copied.

Typically, the file processing device 1 determines whether the date information of the files or file folders in the exterior storage device 7 is later than the last connection date of the exterior storage device 7. The date information can be either the creation date or the last edit date of the file or file folder in the exterior storage device 7. For example, if the creation date or last edit date of a file in the exterior storage device 7 is later than the last connection date, the file processing device 1 determines that the file was created or edited after the last connection, and then copies the file from the exterior storage device 7 to the file processing device 1. If the creation date of a file folder in the exterior storage device 7 is later than the last connection date, the file processing device 1 determines that the file folder in the exterior storage device 7 was created after the last connection, and copies the file folder from the exterior storage device 7 to the file processing device 1. If the last connection date is later than the creation date of a file folder, but earlier than the folder's last edit date, the file processing device 1 performs the same analysis on the files and/or sub file folders in the file folder.

The connection managing module 31 is configured for recording the connection data between the file processing device 1 and the exterior storage device 7. When the exterior storage device 7 is connected to the file processing device 1, the connection managing module 31 obtains the ID of the exterior storage device 7, and searches the connection relationship table for the last connection date corresponding to the ID. If the connection managing module 31 cannot retrieve the last connection date for the ID, it determines that this is the first time the exterior storage device 7 is connected and then copies the files and/or file folders from the exterior storage device 7 to the storage unit 4.

If the connection managing module 31 is able to retrieve the last connection date of the exterior storage device 7 corresponding to its ID in the connection relationship table, it means that this is not the first time the exterior storage device 7 is connected to the file processing device 1. The comparing module 35 compares the date information of the files and/or file folders with the last connection date of the exterior storage device 7. If the creation date or the last edit date of a file or the creation date of a file folder is later than the last connection date of the exterior storage device 7, the comparing module 35 then determines to copy the file and/or file folder from the exterior storage device 7 to the storage unit 4. If the last connection date is later than the creation date of a file folder, but earlier than the folder's last edit date, the comparing module 35 performs the same analysis on files and/or sub file folders in the file folder as described hereinbefore.

Figure 3:
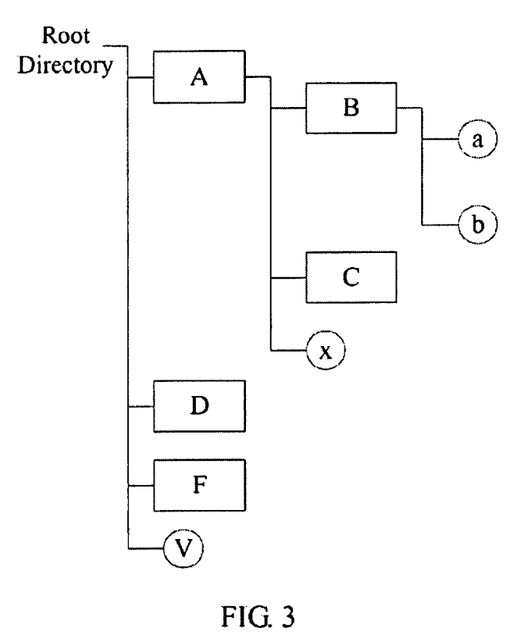
FIG. 3 is a schematic diagram illustrating a file organization of file folders and files according to an exemplary embodiment of the present invention.

The directory managing module 32 is configured for obtaining the file structure of the exterior storage device 7. File structure is a mechanism for organizing data into files and file folders. File folders may contain other file folders, referred to as sub file folders, and/or files. For example, in the exemplary embodiment as shown in FIG. 3, a file structure is shown in a simplified typical hierarchical tree-type file structure. The top-level folder is the root directory or root folder. The root directory may contain file folders and files, file folders may again contain file folders and files, and so on. Referring to FIG. 3, a root directory contains a number of file folders represented by rectangles and files represented by circles. Further, each of the file folders and files is assigned with a flag is for indicating an analysis state of the file folders or the files. The flag is recorded in a state table (not shown) for recording files' and/or file folders' analysis states. For example, when a value of the flag is a first value such as "0", it means that the comparing module 35 has analyzed corresponding file folder or file; when the value of the flag is a second value such as "1", it means that the comparing module 35 has not analyzed the corresponding file folder or file.

The directory managing module 32 is further configured for controlling an access to the hierarchies of the file structure according to a predefined access rule. Typically, the directory managing module 32 accesses the file folders first and the files later, which belong to a same hierarchy.

The determining module 34 is configured for determining whether there is a file and/or a file folder that has not been analyzed in a current hierarchy accessed by the directory managing module 32, i.e. whether there is a file and/or a file folder whose flag value is "1". If there is a file and/or a file folder that has not been analyzed, the date information obtaining module 331 obtains the creation date of the file and/or file folder, and the comparing module 35 compares them with the last connection date.

If the creation date is later than the last connection date, the comparing module 35 generates a matching signal indicating that the file and/or file folder, together with the file structure, needs to be copied. The storage control module 36 determines whether the storage unit 4 has a same file structure as the file structure indicated by the matching signal. For example, referring to FIG. 3, the file structure of a file folder B is "root directory\A\", the storage control module 36 determine whether the storage unit 4 has the same file structure "root directory\A\". If the storage unit 4 does not have the same file structure, the storage control module 36 creates a new file structure in the storage unit 4, based on the matching signal, and copies the file and/or file folder thereto.

If the creation date is earlier than the last connection date, the date information obtaining module 331 then obtains the last edit date of the file and/or file folder. The comparing module 35 compares the last edit date with the last connection date. If the last edit date of the file is later than the last connection date, the comparing module 35 and the storage control module 36 perform the same copying processes on the file. If the last edit date of the file folder is later than the last connection date, the comparing module 35 performs the same analysis on files and/or sub file folders in the file folder as described hereinbefore.

The marking module 37 is configured for marking the file or file folder that has been analyzed. Typically, the marking module 37 sets the flag value of the file and/or file folder that has been analyzed to "0".

In addition, after all the files and/or file folders in the exterior storage device 7 have been analyzed, the connection managing module 31 saves the current date, as the connection date, in the connection relationship table.

Figure 4:
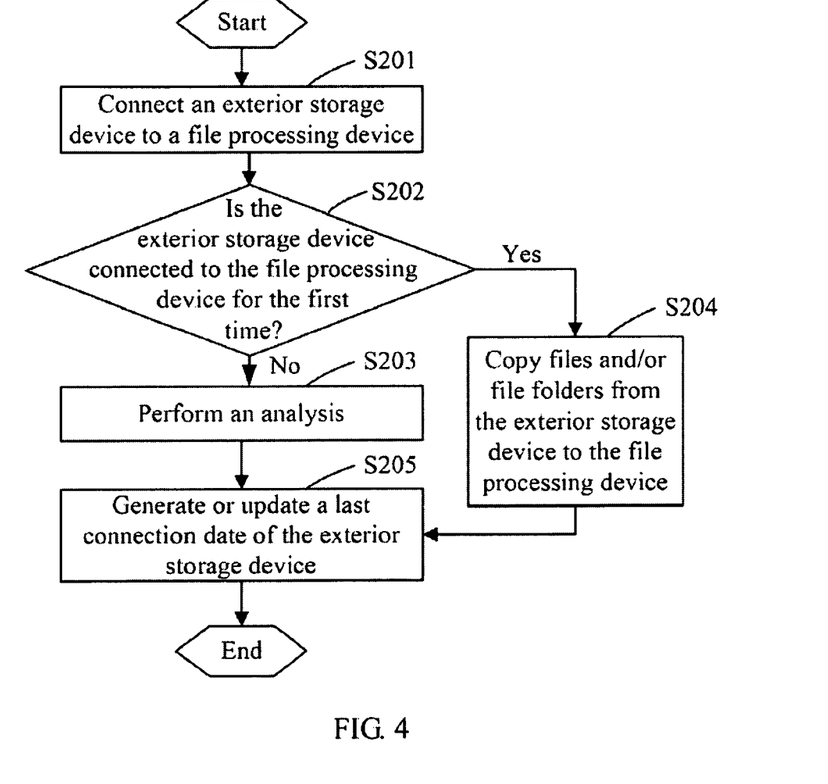
FIG. 4 is a flowchart of a file processing method implemented by the file processing device of FIG. 1 according to an exemplary embodiment of the present invention.

FIG. 4 is a flowchart of a file processing method implemented by the file processing device 1 of FIG. 1 in accordance with an exemplary embodiment of the present invention. In step S201, the exterior storage device 7 is connected to the file processing device 1.

In step S202, the connection managing module 31 determines whether the exterior storage device 7 is connected to the file processing device 1 for the first time.

If the exterior storage device 7 is, not for the first time, connected to the file processing device 1, in step S203, the processing unit 3 performs an analysis on the files and/or file folders in the exterior storage device 7 to determine whether the files and/or file folders need to be copied.

If the exterior storage device 7 is, for the first time, connected to the file processing device 1, in step S204, the processing unit 3 copies the files and/or file folders from the exterior storage device 7 to the storage unit 4.

In step S205, the processing unit 3 generates or updates the connection data between the exterior storage device 7 and the file processing device 1 in the connection record table. Typically, if the exterior storage device 7 is, for the first time, connected to the file processing device 1, the processing unit 3 stores the exterior storage device 7' ID and the current connection date between the exterior storage device 7 and the file processing device 1 as the last connection date in the connection record table. If the exterior storage device 7 is, not for the first time, connected to the file processing device 1, the processing unit 3 updates the last connection date of the exterior storage device 7 with the current connection date in the connection record table.

Figure 5:
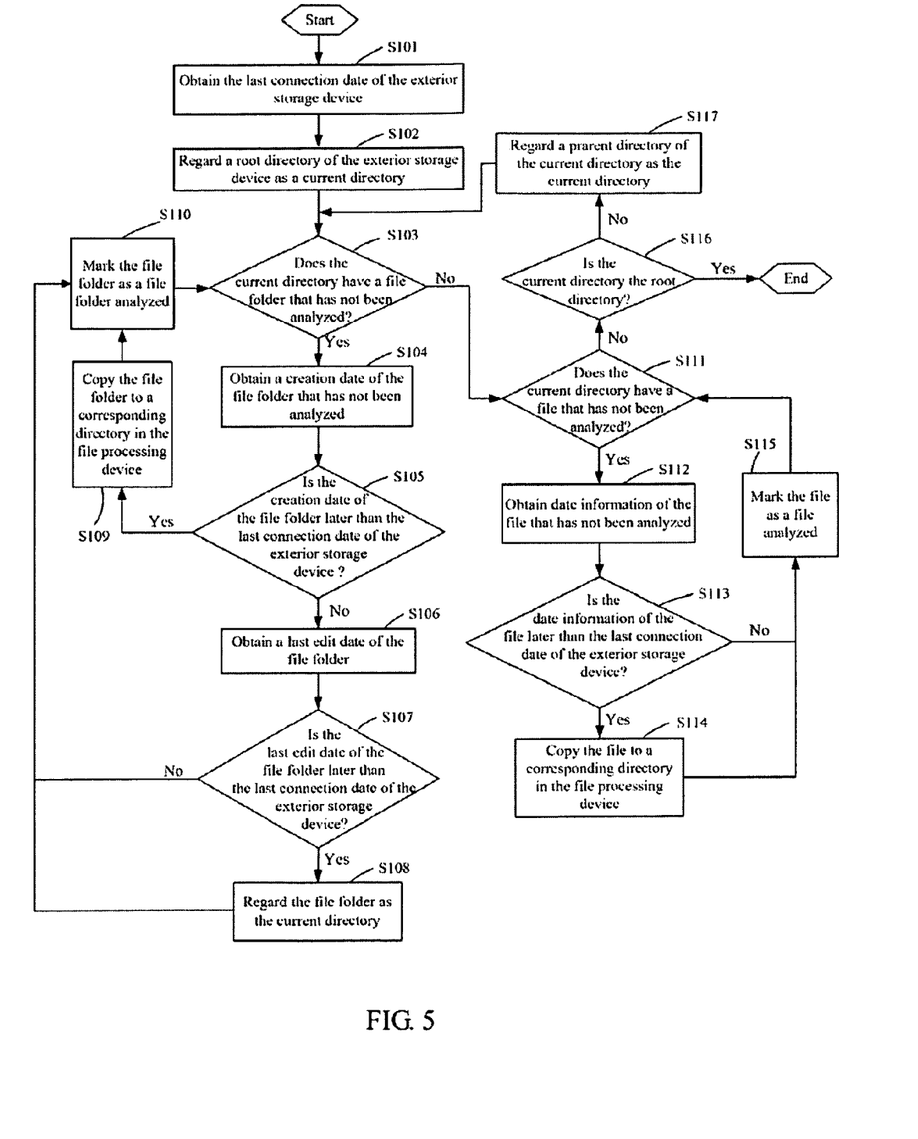
FIG. 5 is a flowchart further detailing steps involved in one step of FIG. 4, namely performing an analysis, according to an exemplary embodiment of the present invention.

FIG. 5 is a flowchart further detailing steps involved in step S203 of FIG. 4, namely performing an analysis, according to an exemplary embodiment of the present invention. In step S101, the connection managing module 31 obtains the ID of the exterior storage device 7 and searches the connection record table for the last connection date corresponding to the ID.

In step S102, the directory managing module 32 obtains the file structure of the exterior storage device 7 and regards the root directory of the file structure as a current directory.

In step S103, the determining module 34 determines whether there is a file folder that has not been analyzed in the current directory based on the flag value of the file folder. If there is not a file folder that has not been analyzed in the current directory, the procedure goes to step S111 described later.

If there is a file folder that has not been analyzed in the current directory, in step S104, the date information obtaining module 331 obtains the creation date of the file folder that has not been analyzed (hereinafter, "the current file folder").

In step S105, the comparing module 35 compares the creation date of the current file folder with the last connection date to determine whether the current file folder was created after the last connection date. If the creation date of the current file folder is later than the last connection date, the procedure goes to step S109 described later.

If the creation date of the current file folder is earlier than the last connection date, in step S106, the date information obtaining module 331 obtains the last edit date of the current file folder.

In step S107, the comparing module 35 compares the last edit date of the current file folder with the last connection date to determine whether the current file folder was edited after the last connection.

If the last edit date of the current file folder is later that the last connection date, in step S108, the directory managing module 32 regards the current file folder as the current directory, and the procedure goes to step S110 described later.

In step S109, the storage control module 36 copies the current file folder from the exterior storage device 7 to a corresponding directory in the storage unit 4 according to the file structure of the current file folder.

In step S110, the marking module 37 marks the current file folder. That is, the marking module 37 sets the flag value of the current file folder to "0".

In step S111, the determining module 34 determines whether there is a file that has not been analyzed in the current directory. If there is a not file that has not been analyzed in the current directory, the procedure goes to step S116 described later.

If there is a file that has not been analyzed in the current directory, in step S112, the date information obtaining module 331 obtains the date information (i.e., the creation date and the last edit date) of the file that has not been analyzed in the current directory (hereinafter, "the current file").

In step S113, the comparing module 35 compares the date information of the current file with the last connection date to determine whether the current file was created or edited after the last connection. If the creation date and the last edit date of the current file are either not later than the last connection date, the procedure goes to step S115 described later.

If the creation date or the last edit date of the current file is later than the last connection date, in step S114, the storage control module 36 copies the current file from the exterior storage device 7 to the corresponding directory in the storage unit 4 according to the file structure of the current file.

In step S115, the marking module 37 marks the current file and the procedure goes to step S111 described hereinbefore. That is, the marking module 37 sets the flag value of the current file to "0".

In step S116, the directory managing module 32 determines whether the current directory is the root directory of the exterior storage device 7. If the current directory is the root directory of the exterior storage device 7, the procedure is ended.

If the current directory is not the root directory of the exterior storage device 7, in step S117, the directory managing module 32 obtains a parent directory of the current directory, and regards the parent directory as the current directory, and the procedure goes to step S103 described hereinbefore.

Figure 6:
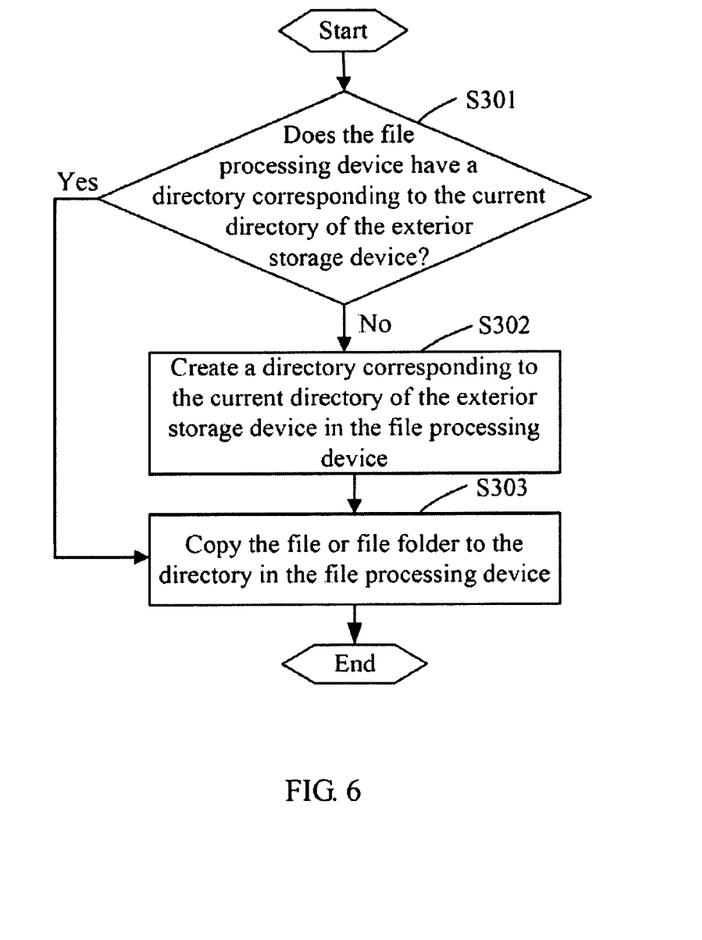
FIG. 6 is a flowchart further detailing steps involved in one step of FIG. 4, namely copying files and/or file folders from the exterior storage device to the file processing device, according to an exemplary embodiment of the present invention.

FIG. 6 is a flowchart further detailing steps involved in step S204 of FIG. 4, namely copying files and/or file folders from the exterior storage device 7 to the file processing device 1, according to an exemplary embodiment of the present invention. In step S301, the storage control module 36 determines whether the storage unit 4 has a directory corresponding to a current directory of the current file and/or file folder in the exterior storage device 7. If so, the procedure goes to step S303 described later.

If not, in step S302, the storage control module 36 creates the directory corresponding to the current directory of the current file and/or file folder in the exterior storage device 7 in the storage unit 4.

In step S303, the storage control module 36 copies the current file and/or file folder from the exterior storage device 7 to the storage unit 4 based on the directory corresponding to the current directory of the current file and/or file folder.

Although the present invention has been specifically described on the basis of preferred embodiments and preferred method thereof, the invention is not to be construed as being limited thereto. Various changes or modifications may be made to the embodiments and method without departing from the scope and spirit of the invention.

What is claimed is:

1. A file processing device comprising
a storage unit;
an interface unit configured for connecting to an exterior storage device;
a connection managing module configured for obtaining an identifier (ID) of the exterior storage device connected to the file processing device and recording a relationship between the obtained ID and a current connection date in the storage unit when the exterior storage device is connected to the file processing device;
a date information obtaining module configured for obtaining date information of a file or a file folder stored in the exterior storage device and for obtaining a last connection date of the exterior storage device according to the ID of the exterior storage device from the storage unit, the date information is selected from the group consisting of a creation date and a last edit date of the file or the file folder;
a comparing module configured for comparing the date information of the files and/or file folders with the last connection date of the exterior storage device and generating a matching signal when the creation date of a file or a file folder is earlier than the last connection date and the last edit date of the file or the file folder is later than the last connection date, wherein the matching signal comprises information of a file or a file folder and its file structure; and
a storage control module configured for copying the file or files, which belong to the file folder and whose creation dates or last edit dates are later than the last connection date according to the matching signal, and storing the copied files in the storage unit.

2. A file processing method for copying a file or file folder from an exterior storage device to a file processing device, the method comprising:
providing a storage unit for storing a relationship between an ID of the exterior storage device and a current connection date when the exterior storage device was connected to the file processing device;
connecting the exterior storage device to the file processing device;
obtaining the ID of the exterior storage device;
retrieving a last connection date of the exterior storage device from the storage unit according to the ID of the exterior storage device;
comparing date information of the file or the file folder with the last connection date of the exterior storage device, wherein the date information is selected from the group consisting of a creation date and a last edit date of the file or the file folder;
searching the exterior storage device for a file whose creation date or last edit date is later than the last connection date, and which belongs to the file folder whose creation date is earlier than the last connection date and whose last edit date is later than the last connection date; and
copying and saving the selected file to the file processing device.

* * * * *